United States Patent

[11] 3,633,786

[72] Inventor Edwin H. Leedy
 Hinsdale, Ill.
[21] Appl. No. 30,911
[22] Filed Apr. 22, 1970
[45] Patented Jan. 11, 1972
[73] Assignee Ekco Products, Inc.
 Wheeling, Ill.

[54] BAKING PAN
 3 Claims, 12 Drawing Figs.
[52] U.S. Cl. .................................................. 220/23.2
[51] Int. Cl. ............................................... B65d 21/02
[50] Field of Search ........................................... 220/23.2,
 23.4, 23.8, 74; 113/120 G, 120 V, 120 CC

[56] References Cited
 UNITED STATES PATENTS
 1,634,248 6/1927 Katzinger ...................... 220/23.2

| 3,332,571 | 7/1967 | Leedy .......................... | 220/23.2 |
| 1,979,664 | 11/1934 | Birkenhauer ................ | 220/23.2 X |
| 3,520,438 | 7/1970 | Ahrens ........................ | 220/23.2 |

FOREIGN PATENTS

| 1,542,731 | 9/1968 | France ....................... | 220/23.4 |

Primary Examiner—George E. Lowrance
Attorneys—Robert D. Teichert and Donald J. Koprowski ABSTRACT: A baking pan comprising a plurality of individual cups joined together in side-by-side relationship. The individual cups are joined together on first outer edge portions of flanges which extend outwardly from the sidewalls of adjacent cups and which coincide with the sides of a polygon. A circumferential band encompasses the cups to complete the basic pan assembly.

Inventor
Edwin H. Leedy
By
Attorney

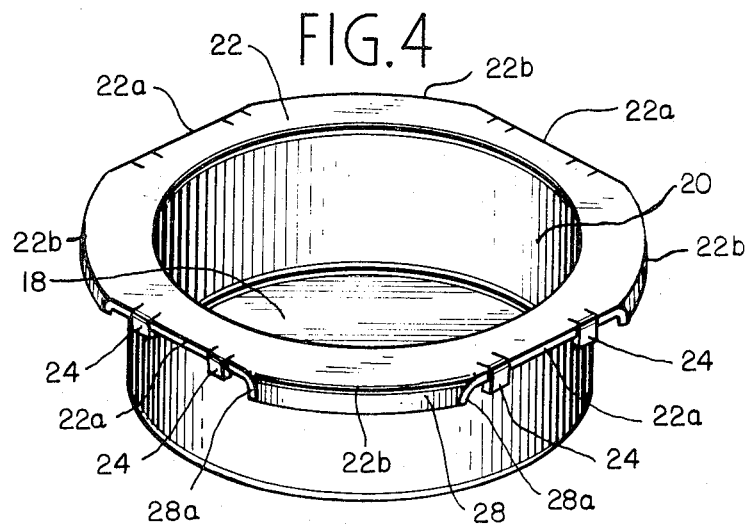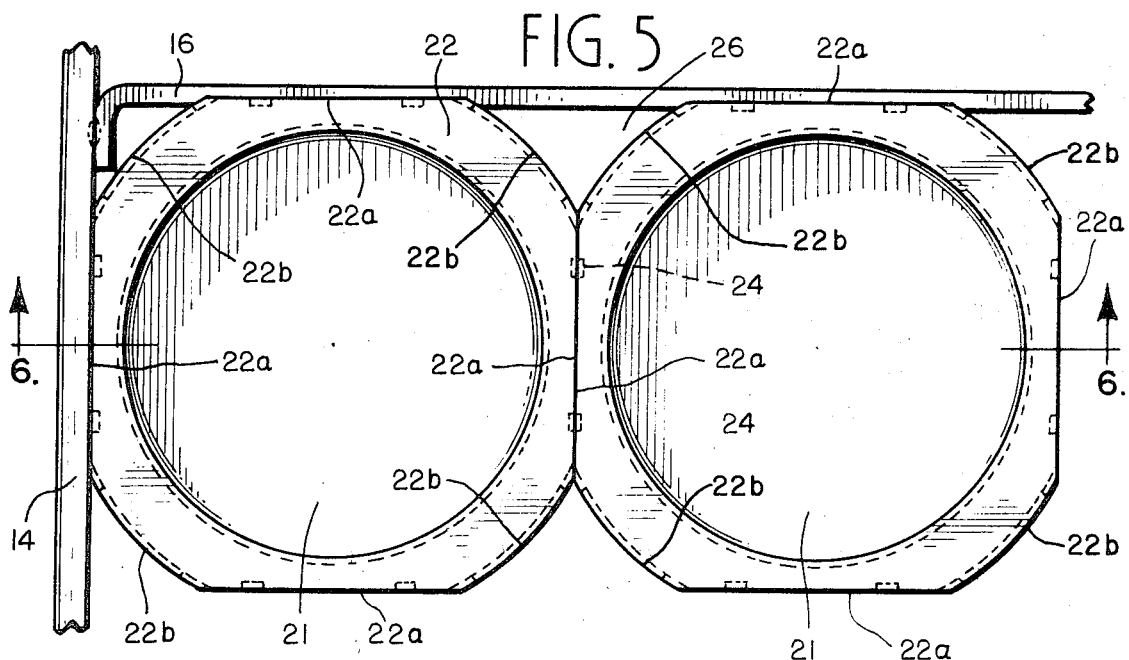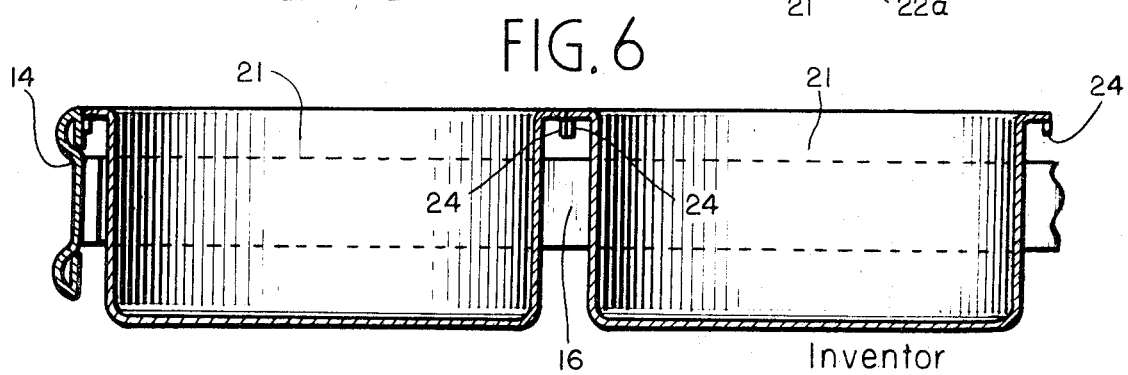
Inventor
Edwin H. Leedy

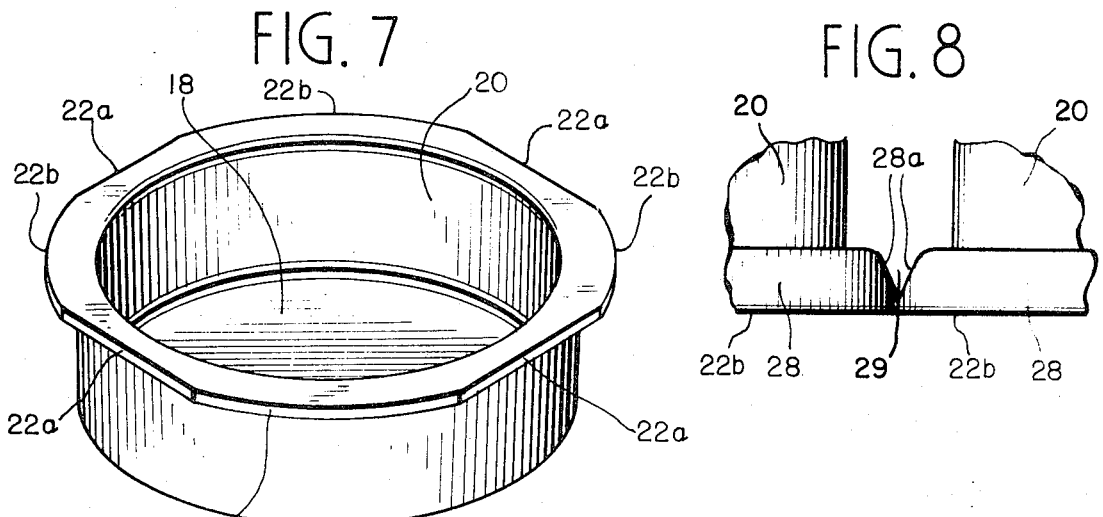
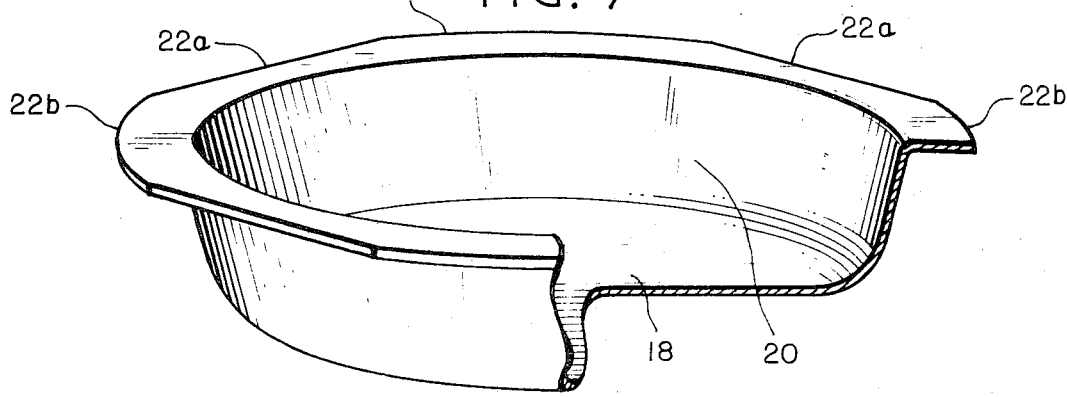
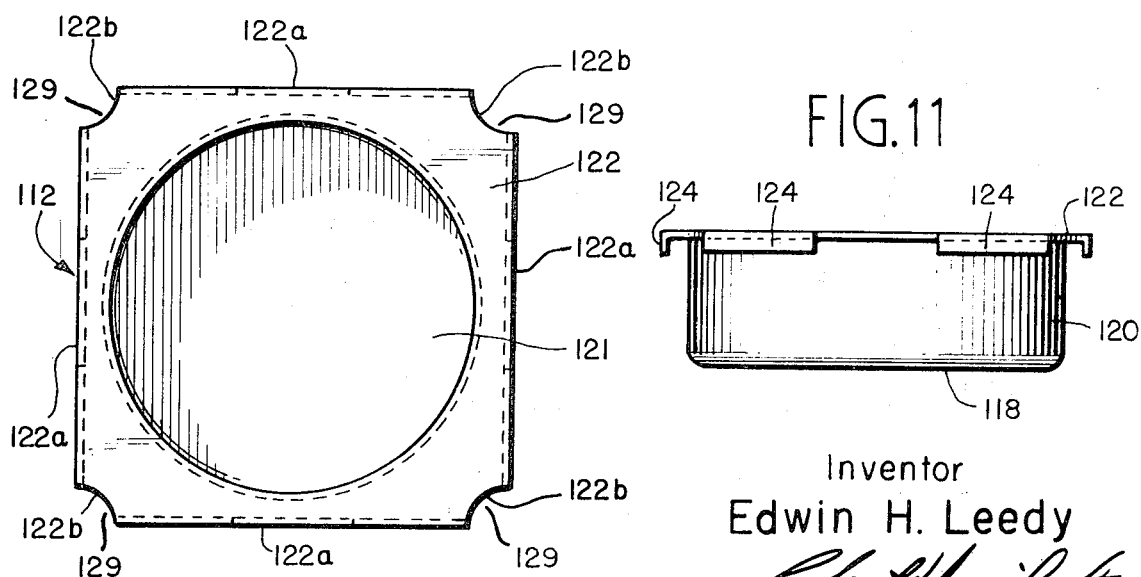
Inventor
Edwin H. Leedy
By
Attorney 3,633,786

BAKING PAN

BACKGROUND OF THE INVENTION

This invention relates to baking pans and more particularly to such pans comprising a plurality of cups, molds, or compartments, joined together in side-by-side relationship, for the baking of breads, buns, rolls, sweet goods, cakes, and other comestibles.

In the baking of a multiplicity of baked products in cups in a single pan set, the following are of prime importance:

a. Achieve the greatest number of baked-product units per square foot of space in the oven, proof box, cooler, and other types of production equipment, commensurate with the size, shape, and other particular characteristics of the finished bake product;

b. Provide for the adaptability of pan set construction to endless shapes and sizes of cups without compromising cup configuration to accommodate the construction method;

c. Within the confines of a designated cup size, provide means for varying the cup centers to achieve a specific condition of spacing between cups and/or to achieve an overall pan size to accommodate the characteristics of the baked product or requirements of production equipment;

d. Provide mechanical strength and stability adequate to withstand abuses in mechanical and hand handling of pan sets;

e. Make the pan sets as lightweight as possible, while maintaining the desired strength and stability, thereby providing for easier handling, minimizing consumption of heat in pan heat-up and therefore achieving minimum baking time;

f. Minimize seams, capillaries, abutments, projections and other configurations in pan structure where soil can collect and resist removal in washing; and g. Be able to select bakepan materials to provide flexibility in pan weight, resistance to corrosion and adaptability to baking characteristics.

In addition, because of the great demand for a great variety of custom-made and custom-shaped pans by the baking industry, it is desirable to be able to provide the advantages and flexibility mentioned above with a basic pan construction concept adaptable to all existing and anticipated requirements.

Several of the above advantages are provided in the bakery pan disclosed in my earlier U.S. Pat. No. 3,332,571. For example, that pan achieves a high number of baked-product units per square foot of space in bakery equipment and also is improved in mechanical strength and stability over the prior art pans. However, in that earlier invention, the shape of the individual cups is limited to the shape disclosed. More particularly, because the sidewalls of the cups provide the surface upon which multiple welds are made, the sidewalls of each cup are required to have flat vertical surfaces to provide the necessary area to locate such welds. It becomes obvious that other shapes, such as round or oval or elliptical, or any tapered cup cannot be achieved in that construction without modification of cup configuration to provide the flat vertical surface. Nor does that invention, for a given cup size, provide means for varying cup centers to achieve a specific condition of spacing between cups and/or to achieve an overall pan size to accommodate characteristics of the baked product or requirements of production equipment. Thus, the present invention is directed at overcoming these disadvantages, as well as providing a pan having all of the advantages above described. Other objects and advantages will become apparent from the description of the drawings and preferred embodiments.

SUMMARY OF THE INVENTION

This invention contemplates the provision of a baking pan having a plurality of cups, each cup having a bottom wall, a sidewall extending upwardly therefrom defining a top opening and a flange extending outwardly from the sidewall forming a border about the top opening. The flange is configured to provide first outer edge portions of dimension measured peripherally of the top opening which coincide with the sides of a polygon, preferably a rectangle. Means are included for securing a group of like bakepan cups in side-by-side fixed assembly which may include one or more depending tongues formed integrally with the flange of each cup along the first outer edge portions of the flanges. The tongues, when used, are aligned with like tongues of adjacent pan cups in the group. The flanges of the cups may include second edge portions which extend transversely of each of the corners of the polygon with which the first outer edge portions of the flanges coincide whereby the second edge portions of the flange of a selected cup and the corresponding second edge portions of adjacent cups cooperate to form an opening between the selected pan cup and the adjacent pan cups. A circumferential band encompasses the multiple-cup assembly.

DESCRIPTION OF THE DRAWINGS

FIG. 4 is a perspective view of one cup of the pan of my invention.

FIG. 5 is an enlarged partial plan view showing two adjacent cups of a pan of my invention.

FIG. 6 is a section taken along line 6—6 of FIG. 5.

FIG. 6a is partial sectional view showing the joint between cups after welding has been completed.

FIG. 7 is a perspective view of a first alternate embodiment of my invention.

FIG. 8 is an inverted elevational view of a portion of the pan of the preferred embodiment of my invention.

FIG. 9 is a perspective view of the first alternate embodiment of my invention showing an alternate cup shape.

FIG. 10 is a top plan view of a second alternate embodiment of my invention.

FIG. 11 is an elevational view of the second alternate embodiment.

DESCRIPTION OF THE PREFERRED EMBODIMENTS

Figure 1:
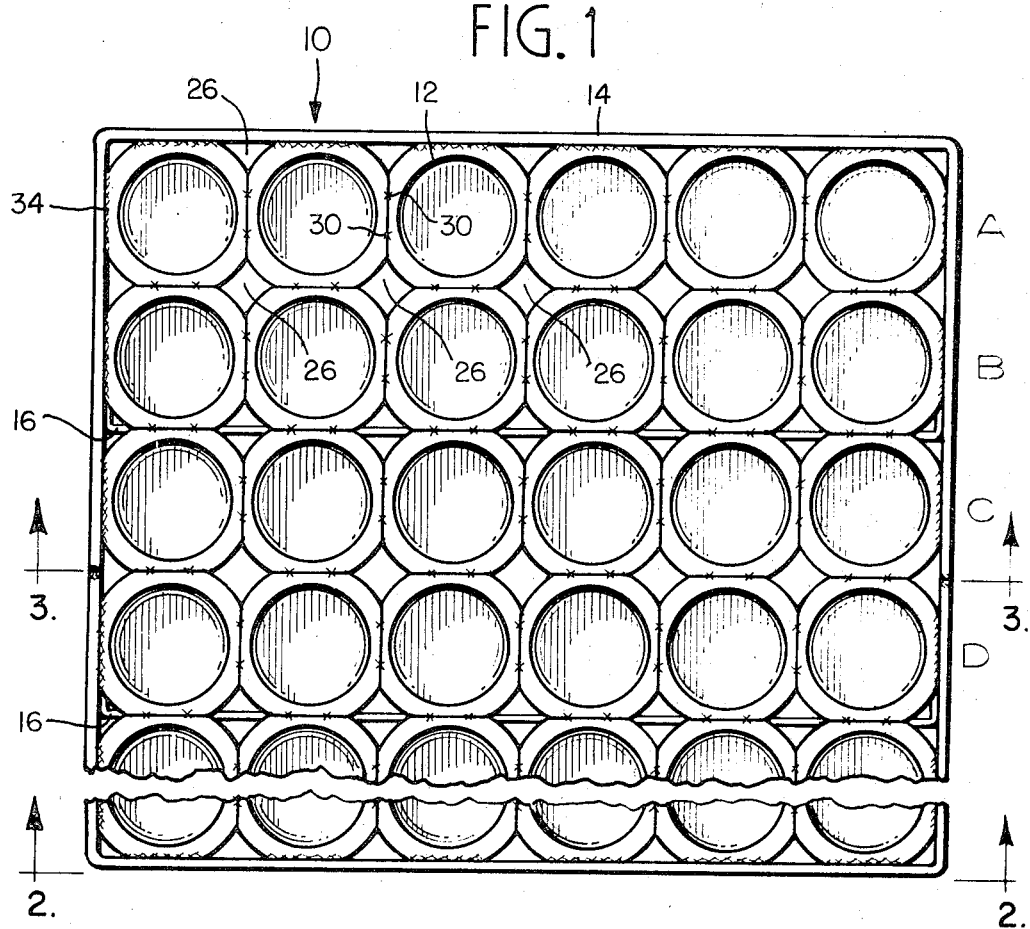
FIG. 1 is a top plan view of the preferred embodiment of the pan assembly of my invention.
Figure 2:
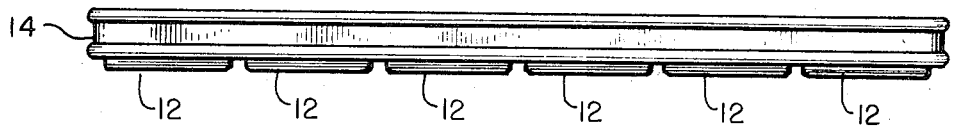
FIG. 2 is an elevational view taken along line 2—2 of FIG. 1.
Figure 3:
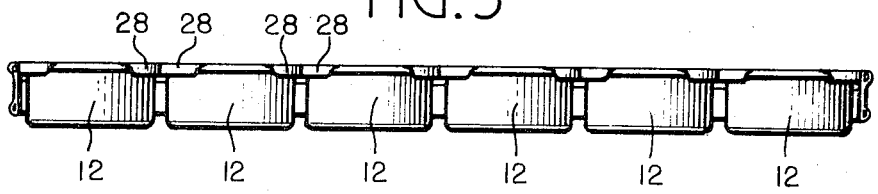
FIG. 3 is an elevational view taken along line 3—3 of FIG. 1.

As a preferred or exemplary embodiment of the present invention, the drawings in FIGS. 1 through 3 illustrate generally a pan 10 having rows of individual cups 12 interconnected to each other and surrounded by a circumferential band 14. Additional strength may be provided by adding interior cross braces 16, the number and placement, depending on the overall size of pan 10 and the cup 12.

Although one of the advantages of the invention is its adaptability to a limitless number of cup shapes, for purposes of illustration each of the cups 12 shown in the preferred embodiment in FIGS. 1 and 4 through 6 is substantially circular and is comprised of a bottom wall 18, a sidewall 20 extending upwardly from the bottom wall 18 defining a top opening 21 and a flange 22 extending outwardly from the sidewall 20 and forming a border about the top opening 21. The flange 22 of each cup 12 is shown to have first outer edge portions 22a which coincide with the sides of a rectangle, although shapes of other polygons may be employed. Securing a group of cups 12 in a side-by-side fixed assembly may be accomplished by several means such as, but not limited to:

1. Resistance- or arc-welding the abutting edges of adjacent cups utilizing only parent cup material in the flat cup flange.

2. Arc-welding the abutting edges of adjacent cups utilizing suitable filler material to supplement the parent material in the flat cup flange.

3. Brazing the abutting edges of adjacent cups utilizing suitable filler material.

4. The preferred method is to provide one or more depending tongues 24 formed integrally with the flange 22 along the first outer edge portion 22a. After welding, the mating tongues 24 of adjacent cups 12 are melted down to form a fused weld nugget 25 spanning the flanges 22 of adjacent cups to bond the cups into a fixed assembly. The tongues 24 remaining on the cups on the perimeter of the fixed cup assembly serve no purpose and may be removed to facilitate attaching of the circumferential band 14 to the cup assembly.

Preferably, the flange 22 of each of the pan cups 12 has second edge portions 22b which extend transversely of each of the corners of the polygon with which the first outer edge portions 22a of the flange 22 coincide. Thus, the second edge portions of the flange of a selected pan cup and the corresponding second edge portion of adjacent cups facing second edge portion of the selected pan cup cooperate to form an open area 26 between the selected pan cup and adjacent pan cups, as best shown in FIG. 1. Preferably, the second edge portion 22b includes a downwardly extending lip 28 formed integrally with flange 22. The lip 28 serves to strengthen the second edge portion 22b. A bevel 28a may be provided at each end of lip 28 so that when any two adjacent cups 10 are connected, a drain opening 29 is formed as shown in FIG. 8. The opening 29 provides for drainage of cleaning solutions and retrieval of greasing materials when the pan is inverted as shown. It should be apparent that while a bevel 28 a is shown, any configuration that allows cleaning and greasing materials to flow from the flange 22 out through such opening 29 and out into open area 26 could be employed.

An alternative method of providing an open area 26 would be to eliminate the second edge portion 22a of flange 22 on the cup 12 and instead pierce or pierce and emboss the opening 26 after assembly of the cups 12 into the multiple-cup assembly or attaching of the circumferential band 14 to the cup assembly.

Each cup 12 may be made in any conventional manner, such as a process comprising the steps of drawing, trimming and forming, well known in the art.

In assembling the pan, adjacent cups 12 are preferably first attached to each other on first outer edge portions 22a to form single rows. For example, FIG. 1 shows rows of cups comprised of six cups each at A, B, C, and D. Adjacent rows are then attached to each other, again on first outer edge portions 22a, and the circumferential band 14 is secured to the periphery. Any amount of rows and any amount of cups in each row may be used to comply with a baker's requirements.

As above stated, welding is the preferred means for attaching the cups 12 to each other and to the reinforcing strap 14 surrounding the cups 12. FIG. 1 shows two welds 30 between each pair of adjacent cups, each interior cup 12 thus having a total of eight welds 30. Obviously, more or fewer welds 30 could be employed, as long as they provided sufficient strength between cups 12. The tongues 24 add strength to the welds 30. When a method such as Tungsten Inert Gas spot welding is used, the tongues 24 melt and form the nugget 25 between the flanges 22 of adjacent cups 12. FIG. 6, for example, shows tongues 24 on adjacent cups 12 aligned before welding. FIG. 6a shows the nugget 25 produced by welding. It should be understood that different types of welding may be used, and that, in some cases, the strength of welds 28 may be sufficient without the provision of tongues 24. For example, FIG. 7 shows a first alternate embodiment of my invention, namely, a cup devoid of the tongues 24 such as those shown in FIG. 4. To attach several of the cups shown in FIG. 7 to each other the cups are welded along first outer edge portions 22a.

When required for additional strength, cross braces 16 may be welded to cups 12 and to circumferential band 14. The circumferential band 14 is preferably secured to the periphery of cups 12 by a continuous weld 34 along the outer length of flange 22, thereby completing the pan 10.

The configuration and construction of circumferential band 14 is widely variable to achieve a compatible assembly relationship between the outer cup flange 22 and the circumferential band 14, and may include a supplementary band (not shown) between circumferential band 14 and the outermost row of cups where required to supply added filler material as may be necessary to the assembly method.

FIG. 9 shows another of the endless different shapes of cups that may be used in this invention. This particular view shows an elliptical cup shape utilized in the first alternate embodiment. It is easily seen that cups having square, rectangular, and other polygonal shapes and oval, star shapes, cups with convolutions or flutes in the walls, etc., just to mention a few, may be used. The important fact is that the shape and size and depth of the cup is independent of the construction of this invention and that cup configuration does not have to be compromised to accommodate such construction. Thus, just by simple machine and fixture adjustment of suitable production equipment, many varieties of cups and pan assemblies can be fabricated on the same equipment.

It should also be apparent from the foregoing that cup centers may be varied by varying the width of flange 22 to accommodate specific characteristics of baked products or production equipment.

As a second alternative embodiment of the present invention, FIGS. 10 and 11 show a cup 112 having a bottom wall 118, a sidewall 120 extending upwardly from the bottom wall 118 defining a top opening 121, and a flange 122 extending outwardly from the sidewall 120. In this embodiment each side of flange 122 has first outer edge portions 122a which are provided with depending tongues 124. In this embodiment the tongue 124 provides additional strength and also serves as a welding surface. Second outer edge portions 122b in the flange 122 provide an opening 129 for the drainage of grease and cleaning agents when the pan is assembled.

It is thought that the invention and many of its attendant advantages will be understood from the foregoing description and it will be apparent that various changes may be made in the form, construction and arrangement of parts without departing from the spirit and scope of the invention or sacrificing all of its material advantages, the forms hereinbefore described being merely a preferred embodiment and one alternative embodiment thereof.

What is claimed is:

1. A bakepan comprising a plurality of individual bakepan cups fixedly assembled in side-by-side relation, each of said bakepan cups having a bottom wall, a sidewall extending upwardly from said bottom wall defining a top opening, and a flange extending horizontally outwardly from said sidewall forming a border about said top opening, said flange being configured to provide first outer edge portions of dimension measured peripherally of said top opening which coincide with the sides of a regular polygon and having at least one depending tongue formed integrally therewith along said first outer edge portions of said flange, which tongues are aligned with like tongues of the cups of said pan in adjacent relation thereto said cups of said bakepan being connected by a welded connection between each of said tongues and the tongues of the neighboring pan cups with which each of said cups has abutting engagement, and said flange of each of said cups of said bakepan having second edge portions which extend transversely of each of the corners of the polygon with which said first outer edge portions of said flange coincide, whereby said second edge portions of the flange of a selected pan cup and the corresponding second edge portion of adjacent pan cups facing said second portions of said selected pan cup cooperate to form an open area between said selected pan cup and said adjacent pan cups, each of said outer edge portions of said flange having a downwardly extending lip formed integrally with said flange, the edge of each lip being beveled so that when one cup is aligned with an adjacent cup, said beveled lip of one cup will be aligned adjacent to the beveled lip of said adjacent cup to form a V-shaped notch to allow for drainage of liquids from said pan through said open areas when said pan is inverted.

2. A bakepan according to claim 1 wherein said polygon is a rectangle.

3. A bakepan according to claim 1 wherein the flange of the pan cups on the perimeter of said pan have a fixed connection with a metal band with which said outwardly facing flanges have abutting engagement whereby said band provides a circumferential rim along the outer edge of said pan.

* * * * *